(12) United States Patent
Beskales

(10) Patent No.: US 11,416,780 B1
(45) Date of Patent: Aug. 16, 2022

(54) METHOD AND COMPUTER PROGRAM PRODUCT FOR TRAINING A PAIRWISE CLASSIFIER FOR USE IN ENTITY RESOLUTION IN LARGE DATA SETS

(71) Applicant: Tamr, Inc., Cambridge, MA (US)

(72) Inventor: George Anwar Dany Beskales, Waltham, MA (US)

(73) Assignee: TAMR, INC., Cambridge, ME (US)

( * ) Notice: Subject to any disclaimer, the term of this patent is extended or adjusted under 35 U.S.C. 154(b) by 0 days.

(21) Appl. No.: 17/481,977

(22) Filed: Sep. 22, 2021

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| | | |
|---|---|---|
| 10,613,785 B1 | 4/2020 | Beskales et al. |
| 11,049,028 B1 | 6/2021 | Beskales et al. |
| 2022/0004565 A1 | 1/2022 | Webber et al. |

OTHER PUBLICATIONS

Schubert, Erich, et al. "A framework for clustering uncertain data." Proceedings of the VLDB Endowment 8.12 (2015): 1976-1979. (Year: 2015).*

Xiong, Caiming, David M. Johnson, and Jason J. Corso. "Active clustering with model-based uncertainty reduction." IEEE transactions on pattern analysis and machine intelligence 39.1 (2016): 5-17. (Year: 2016).*

Rashidi, Frouzan, et al. "Diversity based cluster weighting in cluster ensemble: an information theory approach." Artificial Intelligence Review 52.2 (2019): 1341-1368. (Year: 2019).*

Beskales, George, Mohamed A. Soliman, and Ihab F. Ilyas. "Efficient search for the top-k probable nearest neighbors in uncertain databases." Proceedings of the VLDB Endowment 1.1 (2008): 326-339. (Year: 2008).*

Munteanu, Alexander, Christian Sohler, and Dan Feldman. "Smallest enclosing ball for probabilistic data." Proceedings of the thirtieth annual symposium on Computational geometry. 2014. (Year: 2014).*

(Continued)

*Primary Examiner* — Daniel T Pellett
(74) *Attorney, Agent, or Firm* — Panitch Schwarze Belisario & Nadel LLP

(57) ABSTRACT

A collection of clusters are selected to be used in training in an active learning workflow when using clusters to train supervised entity resolution in data sets. A collection of records is provided wherein each record in the collection has a cluster membership. A collection of record pairs is also provided, each record pair containing two distinct records from the collection of records, and each record pair having a similarity score. A collection of clusters is generated with uncertainty from the collection of records and the collection of record pairs. A subset of the collection of clusters with uncertainty is then selected using weighted sampling, wherein a function of the cluster uncertainty is used as the weight in the weighted sampling. The subset of the collection of clusters with uncertainty is the collection of clusters for training in and active learning workflow when using clusters to train supervised entity resolution in data sets.

24 Claims, 10 Drawing Sheets

(56) References Cited

OTHER PUBLICATIONS

Efraimidis, Pavlos S., and Paul G. Spirakis. "Weighted random sampling with a reservoir." Information processing letters 97.5 (2006): 181-185. (Year: 2006).*

Efraimidis, Pavlos S. "Weighted random sampling over data streams." Algorithms, Probability, Networks, and Games. Springer, Cham, 2015. 183-195. (Year: 2015).*

Efraimidis et al., "Weighted random sampling with a reservoir," Information Processing Letters, vol. 97, No. 5, pp. 181-185 (Mar. 16, 2006).

Efraimidis, P. S. "Weighted Random Sampling over Data Streams," Algorithms, Probability, Networks, and Games. Lecture Notes in Computer Science, vol. 9295, pp. 183-195 (2015).

Mussmann et al., "On the Relationship between Data Efficiency and Error for Uncertainty Sampling," arXiv:1806.06123, 22 pages (2018).

Wikipedia entry for "Reservoir Sampling." Downloaded from web page: <https://en.wikipedia.org/wiki/Reservoir_sampling>, download date: Sep. 17, 2021, date last edited: May 20, 2021, 8 pages.

\* cited by examiner

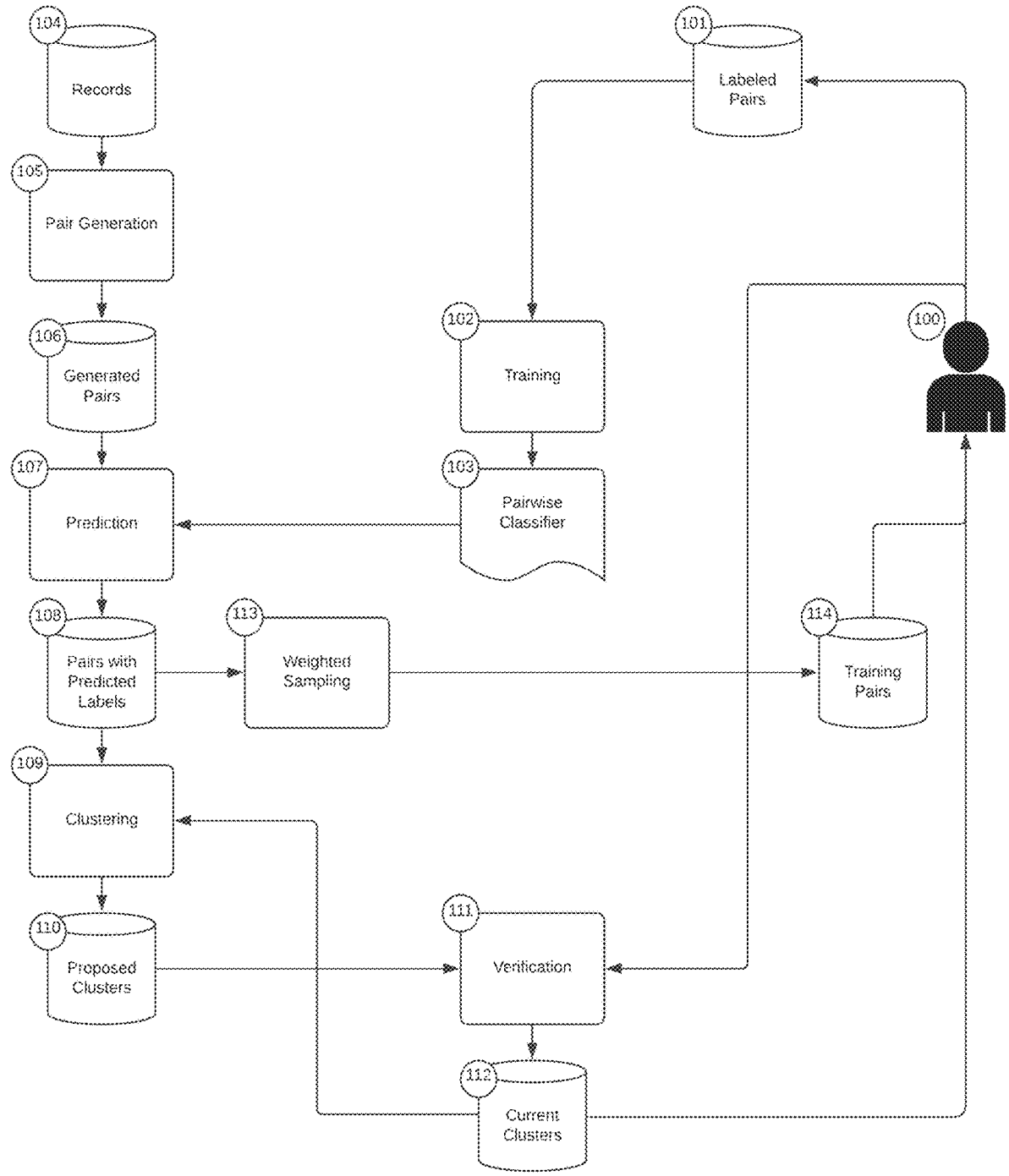
Figure 1: Workflow for Entity Resolution with Supervised Machine Learning Incorporating Active Learning using Record Pairs

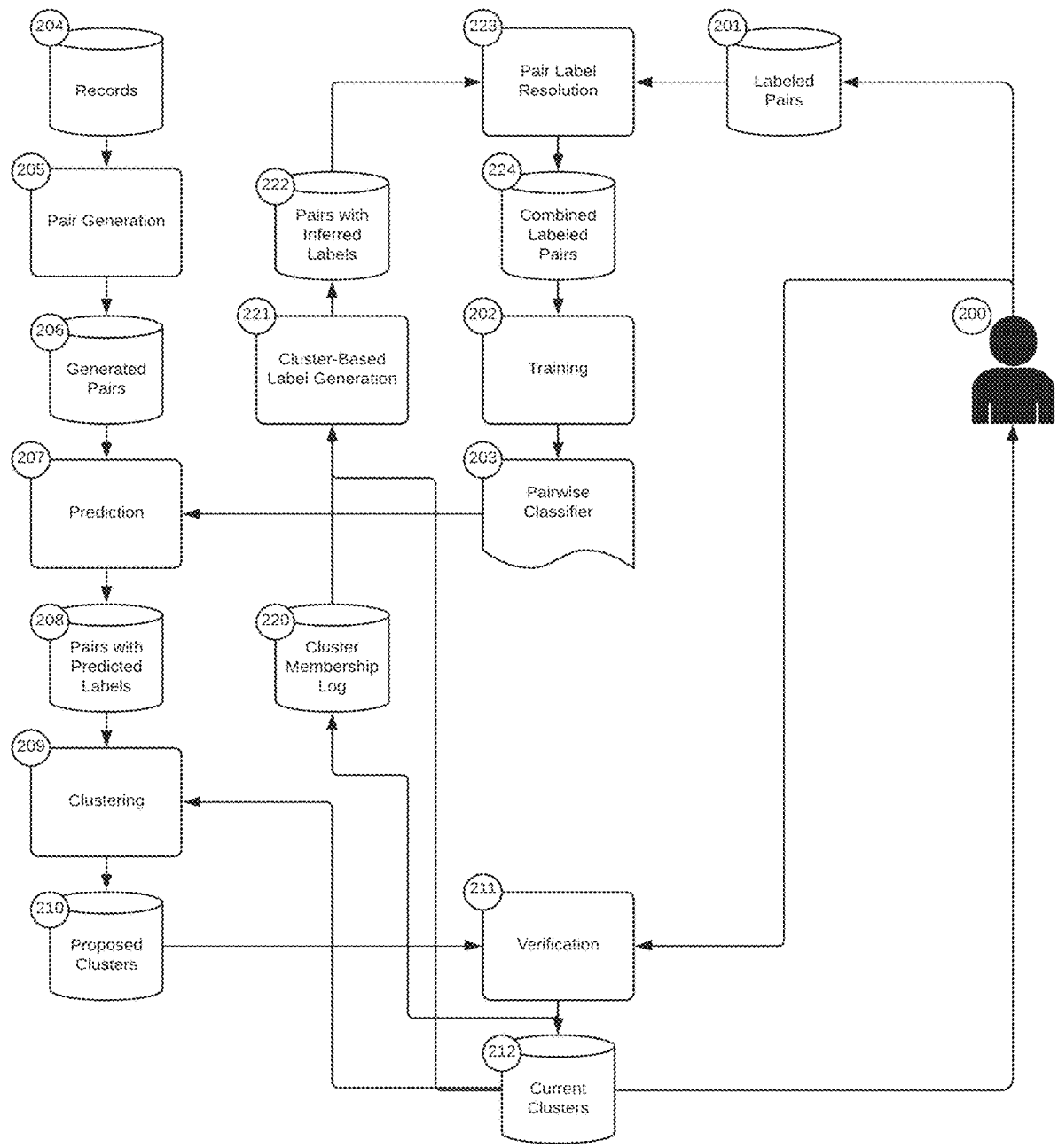
Figure 2: Workflow for Entity Resolution with Supervised Machine Learning Incorporating Learning from Clusters

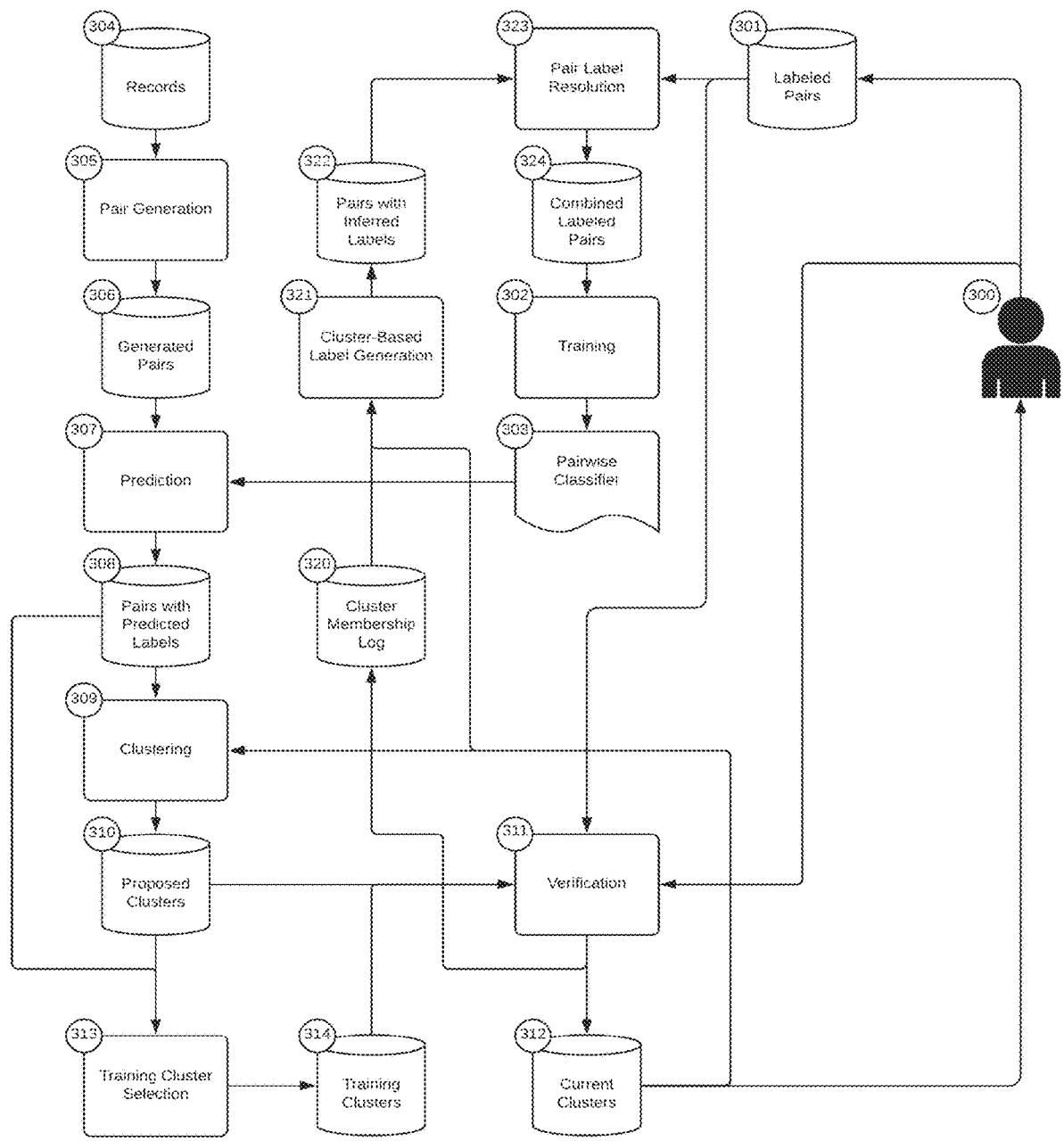
Figure 3: Workflow for Entity Resolution with Supervised Machine Learning Incorporating Active Learning using Record Clusters

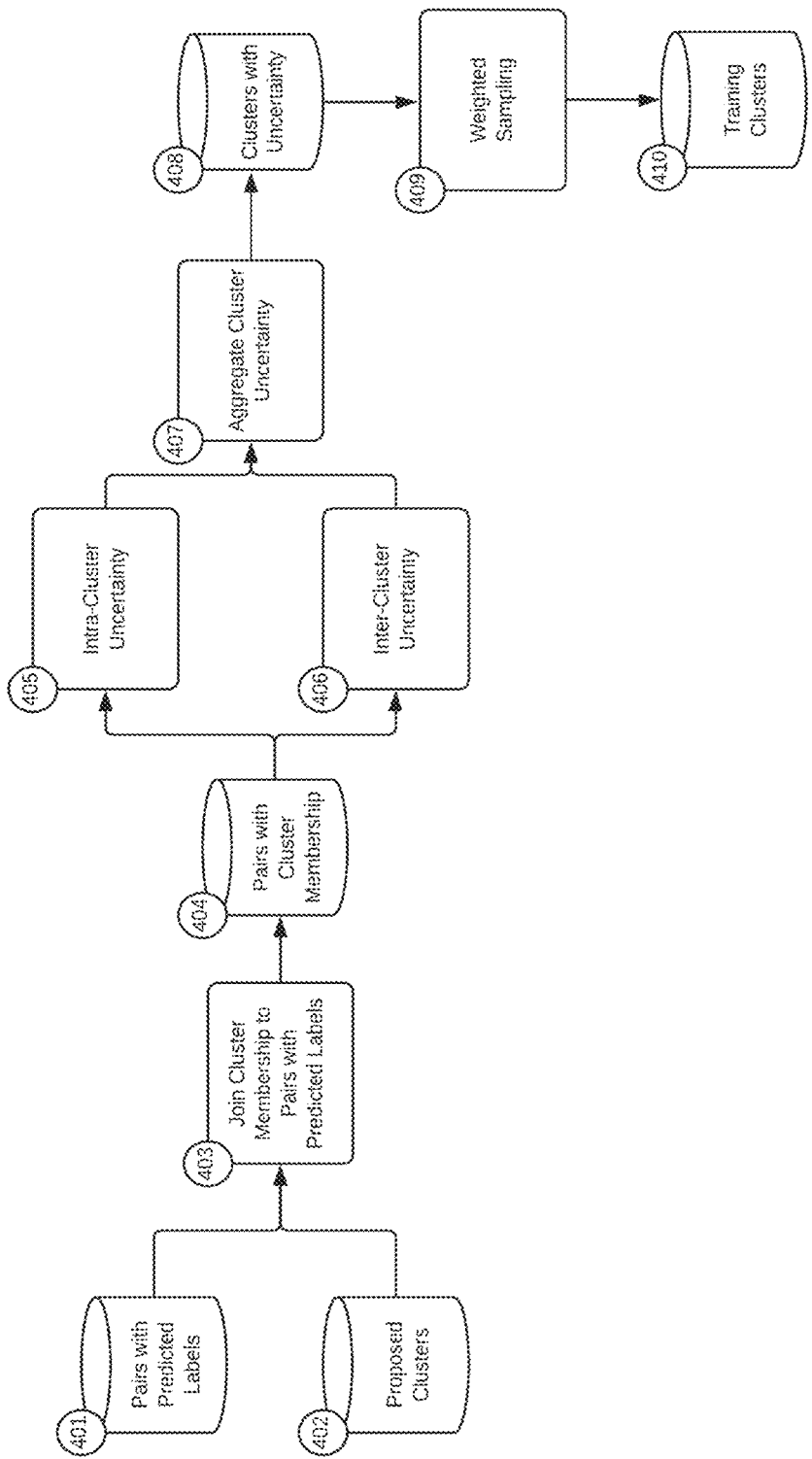
Figure 4: Workflow for selecting training clusters

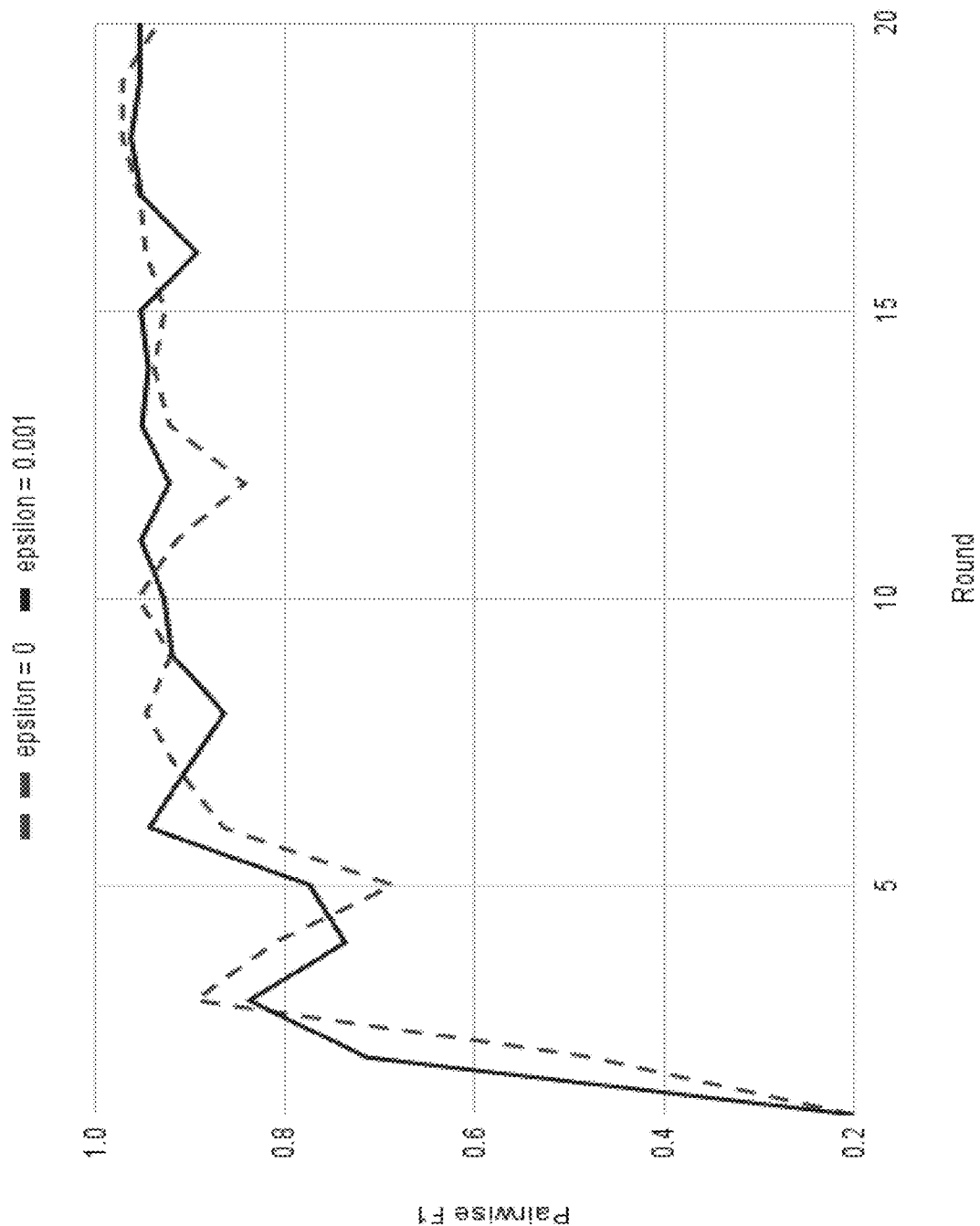
Figure 5: Selection of Epsilon

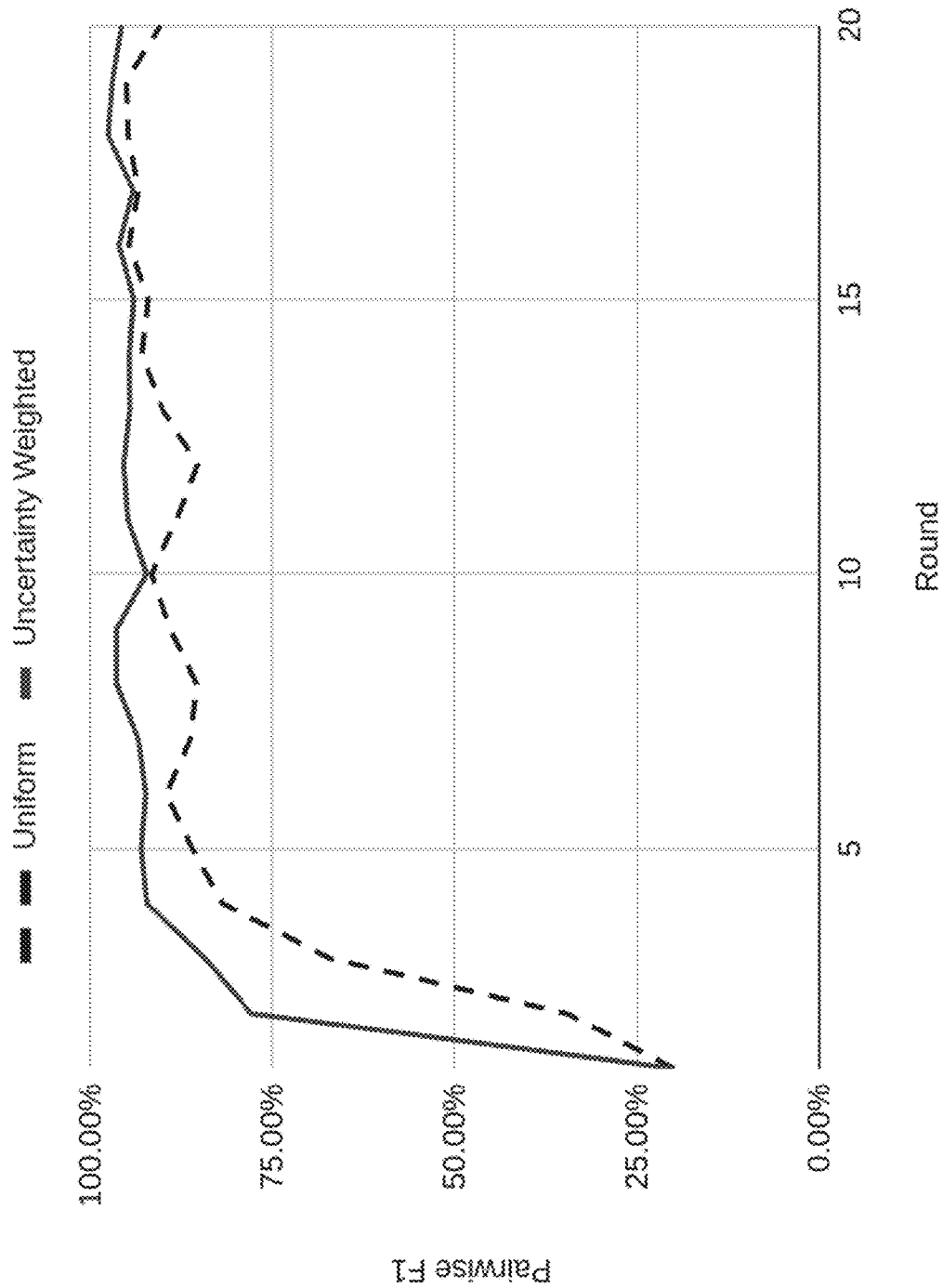
Figure 6: Experimental results

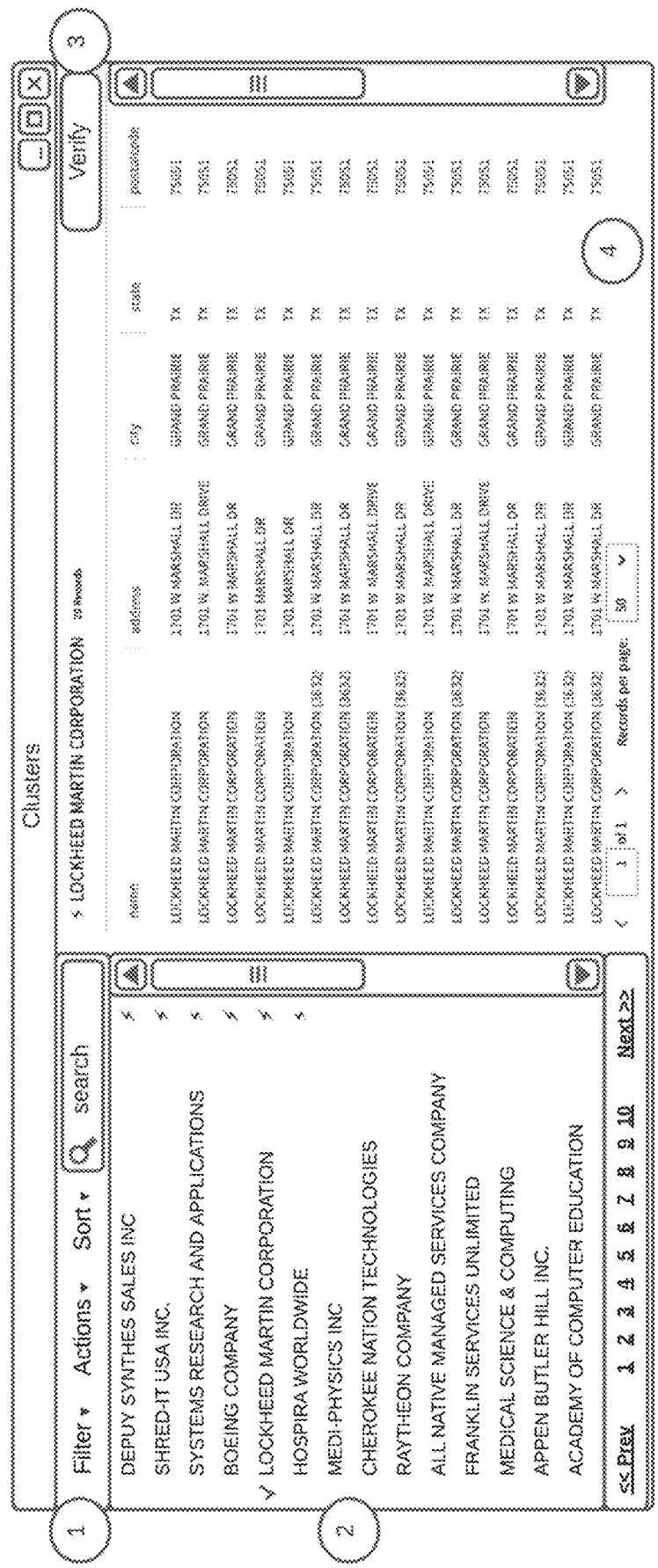
Figure 7: User Interface for Training Cluster Verification

Figure 8: User Interface for Filtering Clusters

Figure 9: User interface for sorting clusters

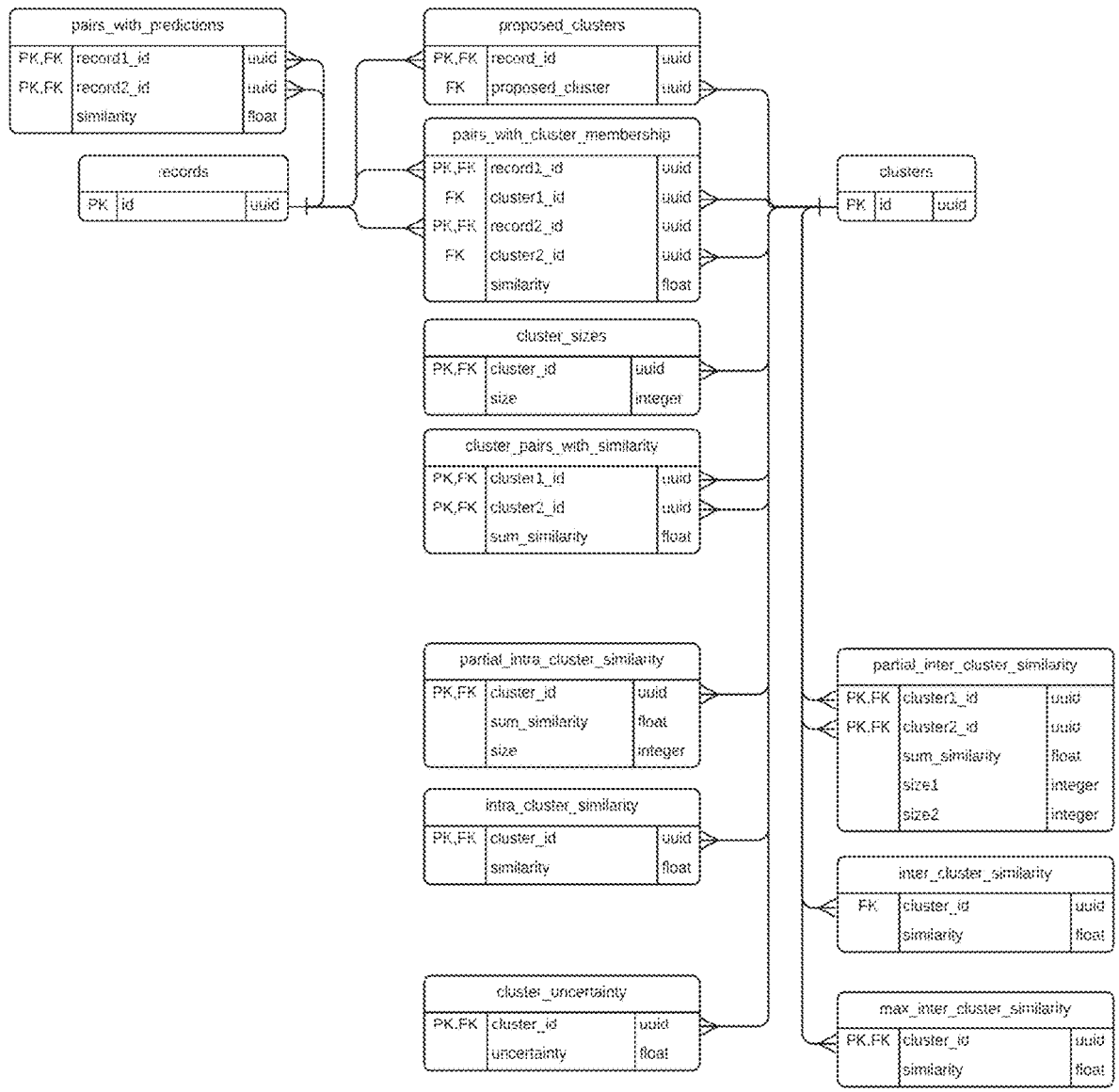
Figure 10: Entity-Relationship Diagram

METHOD AND COMPUTER PROGRAM PRODUCT FOR TRAINING A PAIRWISE CLASSIFIER FOR USE IN ENTITY RESOLUTION IN LARGE DATA SETS

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In the domain of entity resolution, entity resolution in large data sets (millions to billions of records or more, often referred to as "big data") can be performed using machine learning. Previous efforts have shown how supervised machine learning can be trained iteratively using active learning using record pairs to reduce the number of training labels required for the system to converge on a good model, and how to derive training data from clusters, but none that effectively combines the two techniques. What is needed is a method and system for selecting clusters for training in an active learning workflow when using clusters as training labels for supervised entity resolution in large data sets. The present invention fulfills such a need.

BRIEF SUMMARY OF THE INVENTION

Preferred embodiments of the present invention provide a method and system that provide training clusters for use in an active learning workflow for entity resolution in large data sets to rapidly converge on high-accuracy entity resolution, either solely from training clusters suggested by the system or from a combination of training clusters suggested by the system and other training data. This has multiple benefits, as follows:

1. High model accuracy is achieved with better data efficiency than with random training cluster selection, meaning that many fewer training clusters are required to achieve a given level of system accuracy compared to random training cluster selection alone.
2. The active learning workflow is able to more steadily converge on a high-accuracy model—i.e., shows less variance in model accuracy—when compared to naive training cluster selection.
3. The method for approximate weighting of clusters for selection as training clusters is much less computationally expensive than non-approximate approaches while still delivering the desired model accuracy.
4. The method for approximate weighting and selection of clusters as training clusters is readily parallelizable on commodity scale-out compute infrastructure.

BRIEF DESCRIPTION OF THE DRAWINGS

Preferred embodiments of the present invention will now be described by way of example with reference to the accompanying drawings:

FIGS. 1-4 are flowcharts in accordance with preferred embodiments of the present invention.

FIGS. 5-6 show graphical results when using preferred embodiments of the present invention.

FIGS. 7-9 are user interface displays in accordance with preferred embodiments of the present invention.

FIG. 10 is an entity relationship diagram (ERD) in accordance with one preferred embodiment of the present invention.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

I. Terminology and Definitions

The following terminology and definitions are provided to promote understanding of the present invention. The terminology and definitions of the prior art are not necessarily consistent with the terminology and definitions of the present invention. Where there is conflict, the following terminology and definitions apply.

Cluster: the set of records with the same cluster membership in a data set, and metadata pertaining to and linked to that set of records.

Proposed cluster: a cluster produced by an entity resolution workflow, but not yet accepted as the output of the workflow.

Current cluster: a cluster accepted as the output of an entity resolution workflow.

Verified cluster: a cluster in the current clusters that has been verified as being correct.

Record pair: a pair of records from a dataset, and metadata pertaining to and linked to that pair of records. The first record and second record in the pair are not the same record.

Training pair: a record pair tagged to be used in training as part of an active learning workflow.

Training cluster: a cluster tagged to be used in training as part of an active learning workflow.

Labeled cluster: a set of records in a dataset marked as being members of the same cluster. A cluster may be labeled by a human operator or some other process.

Labeled pair: a record pair marked with a class, either MATCH or NON_MATCH. A predicted label may be provided by a pairwise classifier; additional labels may be provided by a human operator or by some other process.

Pairwise classifier (model): a method to predict classes of record pairs, given training data.

II. Detailed Disclosure

1. Existing workflows for Entity Resolution with Supervised Machine Learning 1.1. Workflow for Entity Resolution with Supervised Machine Learning Incorporating Active Learning using Record Pairs FIG. 1 is a flowchart for a standard approach to entity resolution with active learning for supervised machine learning incorporating active learning using record pairs. The process illustrated in FIG. 1 operates as follows:

1. An operator (100) provides labeled pairs (101), consisting of pairs of records with MATCH or NON_MATCH labels.
2. The labeled pairs (101) are used to train (102) a pairwise classifier (103) that will predict whether an input pair should have a MATCH or NON_MATCH label, with an uncertainty score.
3. A collection of records (104) is turned into a collection of generated pairs (106) by pair generation (105).
4. Prediction (107) is performed by applying the pairwise classifier (103) to each of the generated pairs (106) and predicting, for each of the pairs, a label of MATCH or NON_MATCH, with an uncertainty score, thereby producing pairs with predicted labels (108).
5. Clustering (109) is then done on the pairs with predicted labels (108). If there are current clusters that include verified clusters (112), the verified clusters are incorporated into clustering. The result is proposed clusters (110).
6. Verification (111) allows the operator (100) to review the proposed clusters, make changes if desired, to verify that clusters are correct, and to save the proposed clusters with the changes and verifications as the current clusters that include verified clusters (112).

There is also an active learning cycle to augment the labeled pairs that operates as follows:
1. A Weighted Sample (113) is taken from the Pairs with Predicted Labels (108), using a function of the uncertainty scores on the pairs as the weight in the weighted sample, to select a subset of the Pairs with Predicted Labels to use as Training Pairs (114) in Active Learning.
2. The operator (100) uses the current clusters that include verified clusters (112) and the Training Pairs (114) to determine how to adjust and/or augment the labeled pairs (101).
3. The workflow for entity resolution with supervised machine learning can be repeated using the adjusted and/or augmented labeled pairs.

1.2. Workflow for Entity Resolution with Supervised Machine Learning Incorporating Learning from Clusters 1.2.1. Bootstrapping Referring to FIG. 2, there are multiple ways to bootstrap the system:
1. The Operator (200) may provide sufficient labeled pairs (201), and commence with the Training workflow.
2. The Operator (200) may provide proposed clusters (210) from an external system, then proceed with Verification (211) and the workflow to update labeled pairs (201).
3. The Operator (200) may start with a naive pairwise classifier (203) (a pairwise classifier that always predicts NON_MATCH, causing every record to be placed in its own cluster), and commence with the Entity Resolution workflow.

The system is considered to be bootstrapped when there are enough combined labeled pairs (224) to successfully carry out training.

1.2.2. Model Training Workflow
1. An operator (200) provides a possibly empty collection of labeled pairs (201), each labeled pair consisting of a pair of records with an associated MATCH or NON_MATCH label.
2. Pair Label Resolution (223) combines the labeled pairs (201) with a possibly empty collection of pairs with inferred labels (222), resulting in combined labeled pairs (224).
3. The combined labeled pairs (224) are used to train (202) a pairwise classifier (203) that will predict whether an input pair should have a MATCH or NON_MATCH label.

1.2.3. Entity Resolution Workflow
1. A collection of records (204) is turned into a collection of generated pairs (206) using a pair generation method (205).
2. Prediction (207) is performed using the pairwise classifier by applying the pairwise classifier (203) to each of the generated pairs (206) and predicting, for each of the generated pairs, a label of MATCH or NON_MATCH, thereby producing pairs with predicted labels (208).
3. Clustering (209) is then done on the pairs with predicted labels (208) using a clustering algorithm. If there are verified clusters (212), the verified clusters are incorporated into clustering. The result is proposed clusters (210).
4. Verification (211) allows the operator (200) to review the proposed clusters, make changes if desired, to verify that clusters are correct, and to save the result as the current clusters (212). Any changes to clusters are also recorded in the cluster membership log (220). This process of working with proposed clusters which replace current clusters is described in U.S. patent application Ser. No. 16/706,086, now U.S. Patent Application Publication No. 2022-0004565 (Webber et al.) which is incorporated by reference herein, and thus is not described in any further detail herein.

1.2.4. Workflow to Update Training Labels
1. The operator (200) uses the current clusters that include verified clusters (112) to determine how to adjust and/or augment the labeled pairs (201).
2. Cluster-based training label generation (221) examines the current clusters (212) and the cluster membership log (220) to create pairs with inferred labels (222), each pair with inferred label consisting of a pair of records with a label of MATCH or NON_MATCH. This process of creating training data based on cluster labels is described in U.S. Pat. No. 11,049,028 (Beskales et al.), which is incorporated by reference herein, and thus is not described in any further detail herein.

2. Workflow for Entity Resolution with Supervised Machine Learning Incorporating Active Learning using Record Clusters Combining the workflow for active learning for pairs with the workflow for supervised learning from clusters is non-trivial because there is no existing, practical method of ranking and selecting clusters to be used for training in an active learning workflow. Active learning using an Uncertainty Sampling Query Strategy requires an uncertainty metric. When implementing active learning using pairs, a confidence score can be assigned to each pair by the classifier during prediction and pairwise uncertainty can be expressed as a function of this confidence score. Existing methods of computing cluster-level uncertainty based on pairwise confidence are computationally cost prohibitive. Preferred embodiments of the present invention address this challenge.

2.1. Bootstrapping

Referring to FIG. 3, there are multiple ways to bootstrap the system:
1. The Operator (300) may provide sufficient labeled pairs (301), and commence with the Training workflow.
2. The Operator (300) may provide proposed clusters (310) from an external system, then proceed with Verification (311) and the workflow to update labeled pairs (301).
3. The Operator (300) may start with a naive pairwise classifier (303) (a pairwise classifier that always predicts NON_MATCH, causing every record to be placed in its own cluster), and commence with the Entity Resolution workflow.

The system is considered to be bootstrapped when there are enough combined labeled pairs (324) to successfully carry out training. The exact number of combined labeled pairs will vary depending on the training method and pairwise classifier being used. Experimental data shows that using k-fold learning to build a 5-tree random forest, 50 training labels is sufficient to successfully bootstrap the system.

2.2. Model Training Workflow

1. An operator (300) provides a possibly empty collection of labeled pairs (301), each labeled pair consisting of a pair of records with an associated MATCH or NON_MATCH label.
2. Pair Label Resolution (323) combines the labeled pairs (301) with a possibly empty collection of pairs with inferred labels (322), resulting in combined labeled pairs (324).
3. The combined labeled pairs (324) are used to train (302) a pairwise classifier (303) that will predict whether an input pair should have a MATCH or NON_MATCH label, with a similarity score.

2.3. Entity Resolution Workflow

1. A collection of records (304) is turned into a collection of generated pairs (306) using a pair generation method (305).
2. Prediction (307) is performed using the pairwise classifier by applying the pairwise classifier (303) to each of the generated pairs (306) and predicting, for each of the generated pairs, a label of MATCH or NON_MATCH and accompanying similarity score, thereby producing pairs with predicted labels (308).
3. Clustering (309) is then done on the pairs with predicted labels (308) using a clustering algorithm. If there are verified clusters (312), the verified clusters are incorporated into clustering. The result is proposed clusters (310).
4. Training Cluster Selection (313) reads the pairs with predicted labels (308) and the proposed clusters (310) and identifies a subset of the proposed clusters to be used as Training Clusters (314).
5. Verification (311) allows the operator (300) to review the proposed clusters and training clusters, make changes if desired, to verify that clusters are correct, and to save the result as the current clusters that include verified clusters (312). This process of working with proposed clusters which replace current clusters is described in U.S. patent application Ser. No. 16/706, 086, now U.S. Patent Application Publication No. 2022-0004565 (Webber et al.), which is incorporated by reference herein, and thus is not described in any further detail herein. The Operator (300) may be required to verify some or all Training Clusters (314) before proceeding. Any changes to clusters are also recorded in the cluster membership log (320).

2.4. Workflow to Update Training Labels

1. The operator (300) uses the current clusters that include verified clusters (312) to determine how to adjust and/or augment the labeled pairs (301).
2. Cluster-based label generation (321) examines the current clusters (212) and the cluster membership log (320) to create pairs with inferred labels (222), each pair with inferred label consisting of a pair of records with an associated MATCH or NON_MATCH label. This process of creating training data based on cluster labels is described in U.S. Pat. No. 11,049,028 (Beskales et al.), which is incorporated by reference herein, and thus is not described in any further detail herein.

3. Detailed Description of Training Cluster Selection

Active learning using uncertainty sampling requires a sample of clusters from the proposed clusters where the probability of a cluster being included in the sample is proportional to a function of the uncertainty of the cluster. Therefore, a cluster uncertainty metric is required, as well as a method of selecting a weighted sample of clusters with uncertainty.

3.1. Workflow for Selecting Training Clusters

FIG. 4 shows the workflow for selecting training clusters.

1. Pairs with predicted labels (401) are joined (403) with proposed clusters (402) to produce pairs with cluster membership (404).
2. Uncertainty computation has three parts:
   a. Intra-cluster uncertainty (405) is computed using those pairs with cluster membership (404) where both records in the pair are members of the same cluster
   b. Inter-cluster uncertainty (406) is computed using those pairs with cluster membership (404) where the records in the pair are members of different clusters
   c. Intra-cluster uncertainty (405) and inter-cluster uncertainty (406) scores are aggregated (407) by cluster to produce clusters with uncertainty (408)
3. Weighted sampling (409) is performed to select a sample of the clusters with uncertainty (408) using a function of cluster uncertainty as the weight, producing training clusters (410)

3.2. Cluster Uncertainty Metric

Active learning that resists both under- and over-clustering requires a cluster uncertainty metric that is sensitive to both under- and over-clustering. For practical use, the metric must be computable efficiently on data sets of tens of millions of records or more, and wherein cluster sizes may exceed hundreds of thousands of records. In the preferred embodiment, the cluster uncertainty metric combines an intra-cluster metric and an inter-cluster metric to create a single aggregate cluster uncertainty metric that is sensitive to both under- and over-clustering and that can be computed efficiently and in parallel on scale-out distributed compute resources.

3.2.1. Intra-Cluster Uncertainty

Given a cluster $C_i$, the intra-cluster confidence of the cluster is defined as the mean similarity score across all pairs of records within the cluster. Intra-cluster confidence can be computed by summing the similarity of all pairs of records within the cluster, then dividing by the number of pairs; thus the cost to compute intra-cluster confidence is quadratic in the number of records in the cluster. For singleton clusters (clusters with only one record), intra-cluster confidence is defined as 1.

In the preferred embodiment, pairwise similarity is in the range [0, 1] and clusters are formed using the Weighted Pair Group Method with Arithmetic Mean (WPGMA) with an average similarity cutoff threshold of 0.5. This ensures that the intra-cluster confidence of each cluster will be at least 0.5, and at most 1.

One can convert the confidence metric to an uncertainty metric by subtracting from 1; since intra-cluster confidence is in the range [0.5, 1], 1-intra-cluster confidence will be in the range [0, 0.5], with higher confidence translating to lower uncertainty. For singleton clusters, intra-cluster confidence of 1 will translate to an intra-cluster uncertainty of 0.

3.2.2. Approximate Intra-Cluster Uncertainty

In a workflow with pair generation, there are likely to be distinct records that have the same cluster membership even though they are not placed in a pair by pair generation. If these "missing pairs" can be accommodated then an approximation of intra-cluster uncertainty can be computed from the pairs produced by pair generation, eliminating the costly operation of identifying all pairs for each cluster. In the preferred embodiment, the similarity of missing pairs is treated as 0 when clustering. With the average similarity cutoff threshold set to 0.5, the portion of missing pairs in any one cluster is limited to at most 50%. In this scenario intra-cluster confidence can likewise treat the similarity of missing pairs as 0, which will tend to reduce the confidence of clusters with missing pairs closer to 0.5, correctly representing the notion that an increased proportion of missing pairs should correspond to reduced confidence. Thus, approximate intra-cluster confidence for a cluster $C_i$ can be computed as the sum of similarity for all generated pairs where both records in the pair are members of $C_i$, divided by the total number of possible pairs in $C_i$, which is $N*(N-1)/2$, where N is the number of distinct records that are members of $C_i$. This approximation of intra-cluster confidence is denoted $conf(C_i)$, and it is in the range [0.5, 1] for any cluster in the preferred embodiment. Approximate intra-cluster uncertainty is derived from approximate intra-cluster confidence as $1-conf(C_i)$.

In the preferred embodiment, pairwise prediction is performed on the pairs produced by pair generation and clustering is performed on the pairs with predictions. This allows approximate intra-cluster confidence to be efficiently computed at large scale on generated pairs using pairwise similarity and cluster membership. This method is described in Section 3.2.7.

Using standard approaches to grouping and summing, this operation can be performed in the time it takes to sort the generated pairs by cluster membership then scan the result. This operation can be performed in parallel on distributed compute resources by partitioning and distributing the data by cluster membership, reducing the time required to perform the operation to that required to sort and scan the largest partition.

If clusters can fit in memory, then this method can be optimized to eliminate the sort and instead use standard in-memory aggregation techniques, reducing the run time to be proportional to the number of pairs with predictions. This operation can be performed in parallel on distributed compute resources by partitioning and distributing the pairs with predictions and clusters by cluster membership, making the run time for this operation proportional to the number of generated pairs in the largest partition.

3.2.3. Inter-Cluster Uncertainty

Inter-cluster similarity between two clusters $C_i$ and $C_j$ is defined as the mean similarity score across all pairs of records where one record in the pair is a member of $C_i$ and the other record in the pair is a member of $C_j$. An uncertainty metric that is sensitive to under-clustering should have a high value for a cluster $C_i$ if there is any cluster $C_j$ with high inter-cluster similarity to $C_i$. Therefore, use the maximum inter-cluster similarity between cluster $C_i$ and all other clusters as the inter-cluster uncertainty for $C_i$.

In the preferred embodiment, pairwise similarity is in the range [0, 1] and clusters are formed using the Weighted Pair Group Method with Arithmetic Mean (WPGMA) with an average similarity cutoff threshold of 0.5. This ensures that inter-cluster similarity between any two clusters $C_i$ and $C_j$ will be at most 0.5, so inter-cluster similarity will range from 0 to 0.5. To create an inter-cluster uncertainty metric for cluster $C_i$, use the maximum inter-cluster similarity between $C_i$ and all clusters $C_j$, which will have the range [0, 0.5].

3.2.4. Approximate Inter-Cluster Uncertainty

Computing inter-cluster similarity across all clusters is roughly quadratic in the number of records, so computing true inter-cluster similarity for all clusters is computationally intractable for large datasets.

In a workflow with well-tuned pair generation most inter-cluster pairs will be omitted. If these "missing pairs" can be accommodated, then an approximation of inter-cluster uncertainty can be computed from the pairs produced by pair generation, eliminating the costly operation of identifying all inter-cluster pairs. In the preferred embodiment, well-tuned pair generation has approximately 95% precision, indicating that approximately 5% of generated pairs are inter-cluster pairs, though the present invention is effective with much worse precision as it scales linearly with the number of generated pairs, e.g., at 50% precision the number of pairs will be almost double and the run time will also almost double.

The preferred embodiment uses a clustering method (WPGMA) that merges clusters if the intra-cluster confidence of the resulting merged cluster is over the average similarity cutoff threshold, which is set to 0.5. Two clusters with high inter-cluster similarity will not be merged if the resulting cluster would have intra-cluster confidence below the threshold. It is the existence of such "almost-merged" clusters that indicates uncertainty in clustering that may result in under-clustering. For any cluster $C_i$, if there exists a cluster $C_j$ that is "almost-merged", then the resulting merged cluster $C_m$ must have average intra-cluster similarity close to the threshold, 0.5. As discussed above, both $C_i$ and $C_j$ must have at least 50% of their internal pairs produced by pair generation; for their inter-cluster similarity to approach the threshold, the number of inter-cluster pairs produced by pair generation must also approach 50%. Therefore, the similarity of missing pairs is treated as 0 when computing inter-cluster similarity. In this scenario, missing inter-cluster pairs will reduce inter-cluster similarity, correctly representing the notion that an increased proportion of missing pairs should correspond to increasing confidence that the clusters should not be merged.

Thus, one can compute approximate inter-cluster similarity between two clusters $C_i$ and $C_j$ as the sum of similarities of all generated pairs where one record is in $C_i$ and the other in $C_j$, divided by the number of possible pairs between $C_i$ and $C_j$ ($N_i*N_j/2$, where $N_i$ is the number of records in $C_i$ and $N_j$ is the number of records in $C_1$). The inter-cluster similarity for any two clusters $C_i$ and $C_j$ where pair generation does not produce any pairs with one record in $C_i$ and the other in $C_j$ is 0. Denote this approximate inter-cluster similarity based on generated pairs as $sim(C_i, C_j)$ and it is in the range [0, 0.5]. Inter-cluster similarity is converted to inter-cluster uncertainty by taking the maximum similarity across all clusters $C_j$, denoted $max_{j\neq i}sim(C_i, C_j)$. Note that for any cluster $C_i$ for which there are no inter-cluster pairs with $C_i$ as one of the clusters, the inter-cluster uncertainty of $C_i$ is 0.

In the preferred embodiment, pairwise prediction is performed on the pairs produced by pair generation and clustering is performed on the pairs with predictions. This allows approximate inter-cluster similarity to be efficiently computed at large scale on generated pairs using pairwise similarity and cluster membership. This method is described in Section 3.2.7.

As grouping and summing can be performed by sorting and scanning, this operation can be performed in the time it takes to sort the generated pairs by cluster membership then scan the result, three times. This operation can be performed in parallel on distributed compute resources by partitioning and distributing the data by the two cluster memberships for the first sum, then by first cluster, then by second cluster. This approach reduces the time required to compute inter-cluster similarity to that required to sort and scan the largest partitions.

This method can be performed efficiently in parallel by partitioning the data first by the two clusters in the pair, then re-shuffling by first cluster, then again by second cluster. The result is $sim(C_i, C_j)$ computed in time required to sort then shuffle the generated inter-cluster pairs.

3.2.5. Aggregate Cluster Uncertainty

One can now define an aggregate uncertainty score for a cluster $C_i$, denoted uncertainty $(C_i)$, as the sum of the above intra-cluster uncertainty and inter-cluster similarity:

$$uncertainty(C_i) = (1 - conf(C_i)) + \max_{j \neq i} sim(C_i, C_j)$$

Because each of the terms has a value in the range [0, 0.5], the range of uncertainty $(C_i)$ is [0, 1].

A high cluster uncertainty score indicates that the cluster contains records with low similarity to other records in the cluster, does not contain records despite their having high similarity to records in the cluster, or both, making it a good candidate for training in an active learning workflow using uncertainty query strategy.

3.2.6. Approximate Similarity for Record Pairs

There may be situations where record pairs do not have a numeric similarity score. If pairs have labels of MATCH or NON_MATCH, then pair similarity can be approximated as a function of the label, e.g., a pair with a MATCH label can be given approximate similarity 1.0, and a pair with a NON_MATCH label can be given approximate similarity 0.0. Computation of uncertainty then proceeds using the approximate similarity as the similarity score.

3.2.7. Procedure: compute_cluster_uncertainty
 a. Input:
  i. Record cluster membership represented as pairs of $\{(R_i, C_i)\}$ where $R_i$ is a record ID and $C_i$ is the associated cluster ID
  ii. Record pairs with similarity scores, denoted $\{(R_i, R_j, S_{ij})\}$, where $R_i$, $R_j$ are record IDs in each pair, and $S_{ij}$ is the similarity score in range [0, 1] for the pair.
 b. Output:
  Cluster uncertainty scores $\{(C_i, U_i)\}$ where $C_i$ is a cluster ID, and $U_i$ is the uncertainty score in range [0, 1]
 c. Method
  1. Compute cluster sizes $\{(C_i, Size_i)\}$ by grouping $\{(R_i, C_i)\}$ by $C_i$ and counting the number of records in each cluster.
  2. Join $\{(R_i, R_j, S_{ij})\}$ with $S_{ij} > 0$ with $\{(R_k, C_k)\}$ on $R_i = R_k$ and with a second instance of $\{(R_s, C_s)\}$ on $R_j = R_s$. The output of this step is $\{(C_i, C_j, S_{ij})\}$
  3. Group $\{(C_i, C_j, S_{ij})\}$ by $(C_i, C_j)$ and compute the sum of $S_{ij}$ within each group. The output of this step is $\{(C_i, C_j, SumS_{ij})\}$
  4. Compute intra-cluster similarity $\{(C_i, IntraS_i)\}$ as follows
   a. Filter $\{(C_i, C_j, SumS_i)\}$ on $C_i = C_j$
   b. Full outer join the output of step 4.a with $\{(C_k, Size_k)\}$ on $C_i = C_k$
   c. For those records where $C_k$ has been joined on, compute the intra-cluster similarity of each cluster $C_i$ as $$IntraS_i = SumS_{ij} / (Size_k * (Size_k - 1) / 2)$$

d. For each record where $C_k$ has not been joined on, this is a singleton cluster, and $IntraSi$ is assigned the value 1.
   e. The result is $\{(C_i, IntraS_i)\}$
  5. Compute max inter-cluster similarity $\{(c_i, MaxInterS_i)\}$ as follows
   a. Filter $\{(C_i, C_j, SumS_{ij})\}$ on $C_i \neq C_j$
   b. Left outer join the output of step 5.a with $\{(C_k, Size_k)\}$ on $C_i = C_k$ and left outer join the output of step 5.a with another instance of $\{(C_s, Size_s)\}$ on $C_j = C_s$
   c. Compute the inter-cluster similarity of each cluster pair $(C_i, C_j)$ as $InterS_{ij} = SumPr_{ij} / (Size_k * Size_s)$
   d. Map each row in the output of step 5.c to two rows $(C_i, InterS_{ij})$ and $(C_j, InterS_{ij})$
   e. Group the output of step 5.d by $C_i$ and within each group compute $MaxInterS_i = \max(InterS_{ij})$
   f. For each cluster $C_i$ with no value for $MaxInterS_i$, assign the value 0 for its $MaxInterS_i$.
   g. The result is $\{(C_i, MaxInterS_i)\}$
  6. Compute cluster uncertainty $\{(C_i, U_i)\}$ as follows
   a. Join $\{(C_i, IntraS_i)\}$ and $\{(C_i, MaxInterS_i)\}$ on cluster ID $C_i$
   b. Compute cluster uncertainty $U_i$ as $$U_i = (1 - IntraS_i) + MaxInterS_i$$

c. The result is $\{(C_i, U_i)\}$ 3.3. Cluster Sampling

It is now desired to use cluster uncertainty to randomly select K clusters, prioritized by uncertainty. Any previously labeled clusters are excluded from the sample when computing new Training Clusters. Experiments have shown that there is no benefit to keeping a cluster as a Training Cluster if the current model generates it with high certainty, whereas if the current model continues to generate a high cluster uncertainty score for the cluster it will likely be re-selected as a training cluster, therefore any unlabeled training clusters are removed from the set of selected training clusters.

A straightforward means of selecting K Training clusters is a weighted random sample where the weight is proportional to the cluster uncertainty. Using this straightforward approach runs the risk of consistently selecting clusters that no model would be able to predict with low uncertainty, which would not lead to improved models on subsequent training rounds. To avoid this, add a factor, epsilon, to the cluster selection probability to increase the chance that clusters with lower uncertainty will be selected for training. Thus, the selection probability is proportional to (cluster uncertainty+epsilon).

In order to get a random sample of clusters, any weighted random sampling algorithm without replacement can be used, using a function of cluster uncertainty as the weight. Well-known weighted sampling methods are disclosed in the following references:

Efraimidis, Pavlos S. (2015). "Weighted Random Sampling over Data Streams". Algorithms, Probability, Networks, and Games. Lecture Notes in Computer Science. 9295: 183-195.

Efraimidis, Pavlos S.; Spirakis, Paul G. (2006-03-16). "Weighted random sampling with a reservoir". Information Processing Letters. 97 (5): 181-185.

3.3.1. Selection of Epsilon

When epsilon=1, the selection of training clusters is uniform random; when epsilon=0, the selection of training clusters is weighted entirely by uncertainty. Experiments have found that using epsilon=0.001 leads to rapid convergence on a good model. FIG. 5 shows Pairwise F1 score for successive rounds of training with K=20, comparing epsilon=0 and epsilon=0.001. Note that epsilon=0.001 tends to reduce variation in Pairwise F1 in later training rounds.

4. Experimental Results

FIG. 6 shows the pairwise F1 score over successive training rounds with K=50, comparing uniform random selection of training clusters to random selection weighted by uncertainty with epsilon=0.001. The Uncertainty Weighted experiment converges on a model with pairwise F1 score consistently over 90% after 5 training rounds, whereas the Uniform Random experiment does not converge on a model with F1 consistently over 90% until after 15 training rounds, so the Uncertainty Weighted Active Learning is able to converge on a good model in ⅓ the number of rounds as using uniform random training cluster selection. With 50 clusters per training round, the Uniform Random experiment required 750 training clusters, whereas the Uncertainty Weighted experiment required 250 training clusters, a very substantial decrease in the amount of effort required to train the system, also known as data efficiency.

III. User Interface

The proposed clusters and training clusters are presented to the subject matter expert for verification. Training clusters are presented in the user interface with elements indicating that they should be verified at high priority. In the preferred embodiment, these elements include displaying the cluster name with a lightning bolt icon, providing a filter that the user can select to narrow their view to only training clusters, and by having training clusters sort first in the default sort order so that they are the first thing the user sees when starting cluster verification.

FIG. 7 presents an example user interface showing:
1. Menu for cluster list, including menus for filtering clusters, taking actions such as verification on cluster, and sorting and searching clusters;
2. Cluster list, including marking those clusters that have been selected for training with a lightning bolt, e.g., on the cluster for Lockheed Martin Corporation, indicating that they are training clusters, with training clusters sorting first, and showing that the cluster for Lockheed Martin Corporation is the currently selected cluster;
3. Verification action for record list, such that the cluster membership of the displayed records can be verified;
4. Record list, supporting actions such as drag-and-drop to move records between clusters prior to verification.

Figure 8:
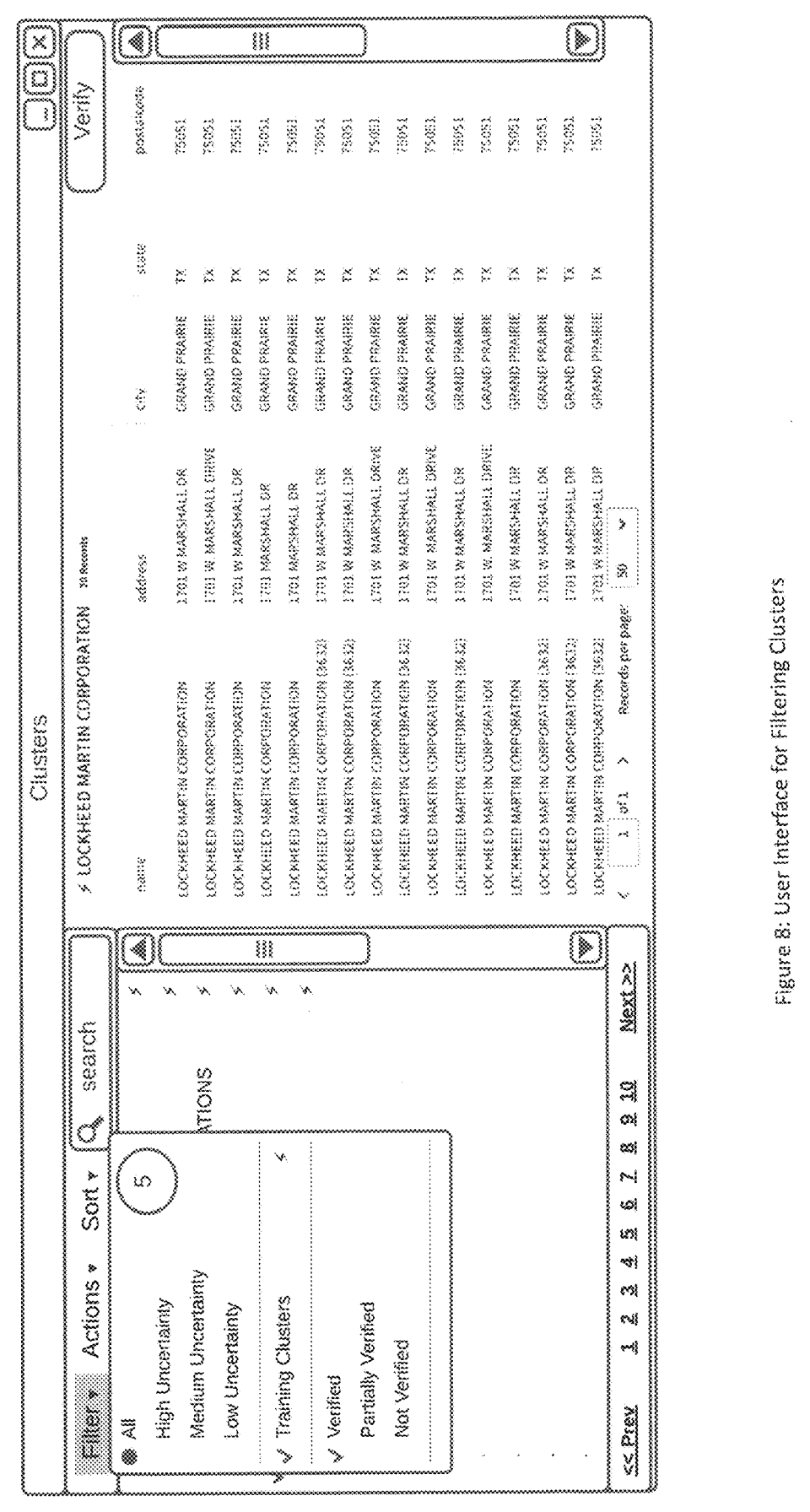

FIG. 8 shows an example user interface showing:
5. Filters for the cluster list, including the ability to filter to training clusters.

Figure 9:
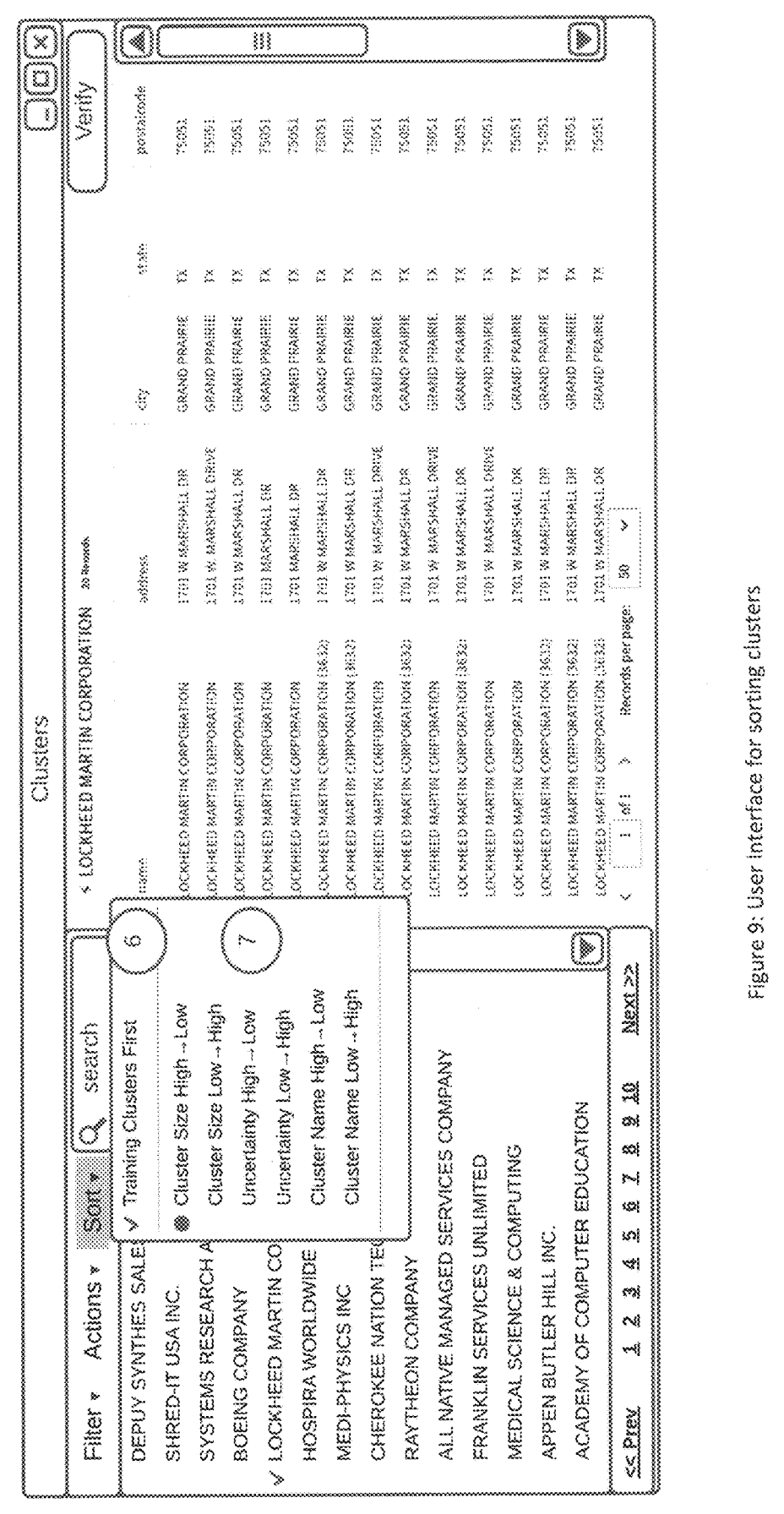

FIG. 9 shows an example user interface showing:
6. The option to sort training clusters first (checked by default)
7. Other sort criteria, such as cluster size, name, or cluster uncertainty

IV. Entity Relationships

FIG. 10 is a self-explanatory entity relationship diagram (ERD) in accordance with one preferred embodiment of the present invention.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for cluster selection, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method for training a pairwise classifier for use in entity resolution in data sets, the method using (i) a collection of records, each record in the collection having a cluster membership, (ii) a collection of record pairs, each record pair containing two distinct records from the collection of records, and each record pair having a similarity score, and (iii) a cluster membership log, each entry in the log having the cluster membership of a record at a point in time, the method comprising:
 (a) generating, using a clustering algorithm, and using software code in a processor, a collection of clusters with uncertainty from the collection of records and the collection of record pairs;
 (b) selecting, using the software code in the processor, a subset of the collection of clusters with uncertainty, the subset of the collection of clusters with uncertainty being selected using weighted random sampling, wherein a function of the cluster uncertainty is used as the weight in the weighted random sampling;
 (c) presenting to a user, via an interface, the subset of the collection of clusters with uncertainty;
 (d) the user indicating, via the interface, for the records in the presented subset of clusters with uncertainty, the correct cluster membership for the records, thereby resulting in a revised cluster membership and a revised cluster membership log for the records;
 (e) creating, using the software code in the processor, inferred training labels using the revised cluster membership and the revised cluster membership log, the inferred training labels including pairs of records from the collection of records, each pair of records having a match or non-match label; and
 (f) training, using the software code in the processor, a pairwise classifier using the inferred training labels, the pairwise classifier being for use in entity resolution in data sets.

2. The method of claim 1 wherein the collection of clusters with uncertainty is generated by:
 (i) joining cluster membership on to pairs,
 (ii) computing intra-cluster uncertainty for each cluster as one minus the average similarity across all pairs wherein both records in the pair are a member of the cluster,
 (iii) computing inter-cluster similarity for pairs of clusters as the average similarity across all pairs wherein one record in the pair is a member of one cluster and the other record in the pair is a member of the other cluster,
 (iv) computing inter-cluster uncertainty for each cluster as the maximum similarity across all pairs of clusters wherein the cluster is one of the clusters in the pair and the other cluster in the pair is not the cluster, and
 (v) summing the intra-cluster uncertainty and the inter-cluster uncertainty for each cluster, thereby producing a collection of clusters with uncertainty.

3. The method of claim 1 wherein the weighted random sampling is done by reservoir sampling.

4. The method of claim 1 wherein the weighted random sampling is done by sampling over data streams.

5. The method of claim 1 wherein the function of cluster uncertainty used in the weighted random sampling is the cluster uncertainty plus a constant epsilon.

6. The method of claim 1 wherein the similarity score for each record pair is computed as a function of its match label.

7. A computer program product for training a pairwise classifier for use in entity resolution in data sets, the computer program product using (i) a collection of records, each record in the collection having a cluster membership, (ii) a collection of record pairs, each record pair containing two distinct records from the collection of records, and each record pair having a similarity score, and (iii) a cluster membership log, each entry in the log having the cluster membership of a record at a point in time, the computer program product comprising a non-transitory computer-readable storage medium tangibly embodying non-transitory computer-executable program instructions thereon that, when executed, causes a computing device to:
 (a) generate, using a clustering algorithm, a collection of clusters with uncertainty from the collection of records and the collection of record pairs;
 (b) select a subset of the collection of clusters with uncertainty, the subset of the collection of clusters with uncertainty being selected using weighted random sampling, wherein a function of the cluster uncertainty is used as the weight in the weighted random sampling;
 (c) present to a user, via an interface, the subset of the collection of clusters with uncertainty;
 (d) receive indications from the user, via the interface, for the records in the presented subset of clusters with uncertainty, the correct cluster membership for the records, thereby resulting in a revised cluster membership and a revised cluster membership log for the records;
 (e) create inferred training labels using the revised cluster membership and the revised cluster membership log, the inferred training labels including pairs of records from the collection of records, each pair of records having a match or non-match label; and (f) train a pairwise classifier using the inferred training labels, the pairwise classifier being for use in entity resolution in data sets.

8. The computer program product of claim 7 wherein the collection of clusters with uncertainty is generated by:
  (i) joining cluster membership on to pairs,
  (ii) computing intra-cluster uncertainty for each cluster as one minus the average similarity across all pairs wherein both records in the pair are a member of the cluster,
  (iii) computing inter-cluster similarity for pairs of clusters as the average similarity across all pairs wherein one record in the pair is a member of one cluster and the other record in the pair is a member of the other cluster,
  (iv) computing inter-cluster uncertainty for each cluster as the maximum similarity across all pairs of clusters wherein the cluster is one of the clusters in the pair and the other cluster in the pair is not the cluster, and
  (v) summing the intra-cluster uncertainty and the inter-cluster uncertainty for each cluster, thereby producing a collection of clusters with uncertainty.

9. The computer program product of claim 7 wherein the weighted random sampling is done by reservoir sampling.

10. The computer program product of claim 7 wherein the weighted random sampling is done by sampling over data streams.

11. The computer program product of claim 7 wherein the function of cluster uncertainty used in the weighted random sampling is the cluster uncertainty plus a constant epsilon.

12. The computer program product of claim 7 wherein the similarity score for each record pair is computed as a function of its match label.

13. A method for training a pairwise classifier for use in entity resolution in data sets, the method using (i) a collection of records, (ii) a collection of record pairs, each record pair containing two distinct records from the collection of records, (iii) a pairwise classifier configured to predict, for a given pair of records, a label of match or non-match and an accompanying similarity score, and (iv) a cluster membership log, each entry in the log having the cluster membership of a record at a point in time, the method comprising:
  (a) predicting, using the pairwise classifier, a label of match or non-match and an accompanying similarity score for each record pair in the collection of record pairs, thereby producing a collection of record pairs with labels and similarity scores;
  (b) generating, using a clustering algorithm, and using software code in a processor, a collection of clusters with uncertainty from the collection of record pairs with labels and similarity scores;
  (c) selecting, using the software code in the processor, a subset of the collection of clusters with uncertainty, the subset of the collection of clusters with uncertainty being selected using weighted random sampling, wherein a function of the cluster uncertainty is used as the weight in the weighted random sampling;
  (d) presenting to a user, via an interface, the subset of the collection of clusters with uncertainty;
  (e) the user indicating, via the interface, for the records in the presented subset of clusters with uncertainty, the correct cluster membership for the records, thereby resulting in a revised cluster membership and a revised cluster membership log for the records;
  (f) creating, using the software code in the processor, inferred training labels using the revised cluster membership and the revised cluster membership log, the inferred training labels including pairs of records from the collection of records, each pair of records having a match or non-match label; and
  (g) training, using the software code in the processor, a pairwise classifier using the inferred training labels, the pairwise classifier being for use in entity resolution in data sets.

14. The method of claim 13 wherein the collection of clusters with uncertainty is generated by:
  (i) joining cluster membership on to pairs,
  (ii) computing intra-cluster uncertainty for each cluster as one minus the average similarity across all pairs wherein both records in the pair are a member of the cluster,
  (iii) computing inter-cluster similarity for pairs of clusters as the average similarity across all pairs wherein one record in the pair is a member of one cluster and the other record in the pair is a member of the other cluster,
  (iv) computing inter-cluster uncertainty for each cluster as the maximum similarity across all pairs of clusters wherein the cluster is one of the clusters in the pair and the other cluster in the pair is not the cluster, and
  (v) summing the intra-cluster uncertainty and the inter-cluster uncertainty for each cluster, thereby producing a collection of clusters with uncertainty.

15. The method of claim 13 wherein the weighted random sampling is done by reservoir sampling.

16. The method of claim 13 wherein the weighted random sampling is done by sampling over data streams.

17. The method of claim 13 wherein the function of cluster uncertainty used in the weighted random sampling is the cluster uncertainty plus a constant epsilon.

18. The method of claim 13 wherein the similarity score for each record pair is computed as a function of its match label.

19. A computer program product for training a pairwise classifier for use in entity resolution in data sets, the computer program product using (i) a collection of records, (ii) a collection of record pairs, each record pair containing two distinct records from the collection of records, (iii) a pairwise classifier configured to predict, for a given pair of records, a label of match or non-match and an accompanying similarity score, and (iv) a cluster membership log, each entry in the log having the cluster membership of a record at a point in time, the computer program product comprising a non-transitory computer-readable storage medium tangibly embodying non-transitory computer-executable program instructions thereon that, when executed, causes a computing device to:
  (a) predict, using the pairwise classifier, a label of match or non-match and an accompanying similarity score for each record pair in the collection of record pairs, thereby producing a collection of record pairs with labels and similarity scores;
  (a) generate, using a clustering algorithm, a collection of clusters with uncertainty from the collection of record pairs with labels and similarity scores;
  (b) select, using the software code in the processor, a subset of the collection of clusters with uncertainty, the subset of the collection of clusters with uncertainty being selected using weighted random sampling, wherein a function of the cluster uncertainty is used as the weight in the weighted random sampling;
  (c) present to a user, via an interface, the subset of the collection of clusters with uncertainty;
  (d) receive indications from the user, via the interface, for the records in the presented subset of clusters with uncertainty, the correct cluster membership for the records, thereby resulting in a revised cluster membership and a revised cluster membership log for the records;
(e) create inferred training labels using the revised cluster membership and the revised cluster membership log, the inferred training labels including pairs of records from the collection of records, each pair of records having a match or non-match label; and
(f) train a pairwise classifier using the inferred training labels, the pairwise classifier being for use in entity resolution in data sets.

20. The computer program product of claim 19 wherein the collection of clusters with uncertainty is generated by:
    (i) joining cluster membership on to pairs,
    (ii) computing intra-cluster uncertainty for each cluster as one minus the average similarity across all pairs wherein both records in the pair are a member of the cluster,
    (iii) computing inter-cluster similarity for pairs of clusters as the average similarity across all pairs wherein one record in the pair is a member of one cluster and the other record in the pair is a member of the other cluster,
    (iv) computing inter-cluster uncertainty for each cluster as the maximum similarity across all pairs of clusters wherein the cluster is one of the clusters in the pair and the other cluster in the pair is not the cluster, and
    (v) summing the intra-cluster uncertainty and the inter-cluster uncertainty for each cluster, thereby producing a collection of clusters with uncertainty.

21. The computer program product of claim 19 wherein the weighted random sampling is done by reservoir sampling.

22. The computer program product of claim 19 wherein the weighted random sampling is done by sampling over data streams.

23. The computer program product of claim 19 wherein the function of cluster uncertainty used in the weighted random sampling is the cluster uncertainty plus a constant epsilon.

24. The computer program product of claim 19 wherein the similarity score for each record pair is computed as a function of its match label.

* * * * *